United States Patent [19]

Liborius

[11] Patent Number: 5,648,118
[45] Date of Patent: Jul. 15, 1997

[54] CONTINUOUS MULTI-CELL PROCESS FOR PARTICLE COATING PROVIDING FOR PARTICLE RECIRCULATION IN THE RESPECTIVE CELLS

[75] Inventor: Erik Liborius, Ellicott City, Md.

[73] Assignee: Niro A/S, Soeborg, Denmark

[21] Appl. No.: 518,313

[22] Filed: Aug. 23, 1995

Related U.S. Application Data

[62] Division of Ser. No. 206,174, Mar. 7, 1994, Pat. No. 5,470,387.

[51] Int. Cl.⁶ .................................................. B05D 7/00
[52] U.S. Cl. ........................ 427/213; 427/212; 427/221; 427/214
[58] Field of Search ................................ 427/212, 213, 427/221, 214; 118/303, DIG. 5, 310, 326

[56] References Cited

U.S. PATENT DOCUMENTS

| | | |
|---|---|---|
| 3,241,520 | 3/1966 | Wurster et al. .................... 118/303 |
| 4,008,685 | 2/1977 | Pierce . |
| 4,237,814 | 12/1980 | Ormos et al. . |
| 4,387,120 | 6/1983 | Barnert . |
| 4,462,903 | 7/1984 | Wettengl . |
| 4,495,215 | 1/1985 | Barnert et al. . |
| 4,535,006 | 8/1985 | Naunapper et al. . |
| 4,749,595 | 6/1988 | Honda et al. . |
| 5,198,029 | 3/1993 | Dutta et al. . |
| 5,211,985 | 5/1993 | Shirley, Jr. et al. . |
| 5,236,503 | 8/1993 | Jones . |
| 5,476,528 | 12/1995 | Trimm et al. ........................... 71/21 |

FOREIGN PATENT DOCUMENTS 1481034  7/1977  United Kingdom .

*Primary Examiner*—Shrive Beck
*Assistant Examiner*—David M. Maiorana
*Attorney, Agent, or Firm*—Armstrong, Westerman Hattori, McLeland & Naughton

[57] ABSTRACT

A process for continuously producing coated particles, and in particular, particles in which the coating is uniform, contiguous and of minimal thickness is described, together with an apparatus for conducting the coating process in which a plurality of coating cells connected in series are provided wherein the particles are pneumatically conveys during the coating application and in which controlled recirculation of particles occurs within each cell and a controlled spray is applied to the particles in order to produce a substantially uniform distribution of coating.

7 Claims, 9 Drawing Sheets

CONTINUOUS MULTI-CELL PROCESS FOR PARTICLE COATING PROVIDING FOR PARTICLE RECIRCULATION IN THE RESPECTIVE CELLS

This is a division of application Ser. No. 08/206,174 filed Mar. 7, 1995 now U.S. Pat. No. 5,470,387.

FIELD OF THE INVENTION

This invention relates to the coating of particulate materials. More particularly, the invention concerns a process and related apparatus for coating particulate materials as, for example, a particulate water soluble fertilizer material giving it a prolonged and controlled release rate.

BACKGROUND OF THE INVENTION

Coatings are commonly applied to particulate materials as, for example, may be required to control the rate of release of an active ingredient in the material over an extended period. One such application for such coatings is slow-release fertilizers in which the release rate of the fertilizer is controlled in order to extend the period of time over which the active ingredients, i.e., the nutrients, are delivered.

Some commercial fertilizers, of which urea is a typical example, are water soluble and dissolve rapidly when in contact with water. Consequently, when fertilizers of this type are employed for agricultural or horticultural purposes most of the nutrients are rapidly dissolved when the fertilizers are placed in contact with moisture present in the soil. It is well known that the rate of release of nutrients from the affected fertilizers can be extended, and even controlled, by enveloping the fertilizer particles in a coating suitable for the purpose. These fertilizers are referred to as "slow release fertilizers" or "controlled release fertilizers" and are used extensively on lawns, gardens and on horticultural and agricultural crops. Coating of particulate materials is also useful in applications other than fertilizers, such as for example in the pharmaceutical industry for obtaining slow release of orally administered medicaments.

In the present specification, although reference is made throughout to the coating of fertilizers, it should be understood that the same technique can be used for the coating of other active ingredients.

When particles of fertilizer are coated for the above-stated purpose, it is desirable in order to provide a consistent, controlled release of nutrients, that the thickness of the coating be substantially uniform. Also, because the coating material dilutes the fertilizer thereby decreasing the amount of plant nutrients per unit weight of coated product, it necessary to keep the layer or layers of coating materials applied to the particles as thin as possible. The requirements for the production of the coated fertilizer product not only increase the production cost of the concerned fertilizer product but also add to the costs involved with transportation, storage and application of the fertilizer material.

Attempts have been made to improve the cost effectiveness of coating particulate materials. U.S. Pat. No. 3,241, 520 granted Mar. 22, 1966 to D. E. Wurster, et al., for example, describes an apparatus in which a plurality of layers of the same or different coating materials are applied to particles during sequential flow through a plurality of coating and subsidence zones occupying a series of cells. According to the teaching of this patent, the particles to be coated are entrained in an air stream conducted through a diffused spray of the dissolved coating material in the coating zone of a cell. After coating, the particles are deposited in the subsidence zone of the cell to await continued movement into the succeeding cell in the series. The process described in this patent suffers the disadvantage that there can be no particle recirculation through the spraying zones in the respective cells. Although the patent describes embodiments of the invention that contemplate particles recirculation such teachings are limited to batch-type operation of the unit.

An alternative manner of multi-cell production of coated, particles is described in U.S. Pat. No. 5,211,985 granted May 18, 1993 to A. R. Shirley, Jr. et al. and assigned to ICI Canada, Inc. This patent discloses an apparatus and process for continuously producing polymer-coated particles in a plurality of series-connected fluidized beds, in each of which the particles are conducted essentially randomly through a coating material spray. The production system disclosed in this patent is deficient in that it does not permit a controlled application of coating material to the substrate particles. Accordingly, an accurate control of the release rate of the particulate material. cannot be obtained.

Consequently, while both of these patents illustrate methods and apparatus for coating particles, neither of the patents teaches or suggests methods and apparatus suitable for the cost effective manufacture of a coated product in which the coating is essentially uniform in thickness, thereby leading to a coated product with a controlled release of the enclosed ingredients. It is to the amelioration of this problem, therefore, to which the present invention is directed.

SUMMARY OF THE INVENTION

Accordingly, the present invention provides an improved method for obtaining a uniformly coated product having substantially complete surface coverage by the application of several thin layers of coating materials, rather than a single thick coating.

A first aspect of the present invention relates to an apparatus for applying coatings to discrete particles, comprising: means for defining a substantially closed chamber; a plurality of partitions disposed on longitudinal spacing throughout the chamber for dividing the chamber into a plurality of cells; means forming a substantially vertically extending conduit having open upper and lower ends spaced vertically from adjacent upper and lower surfaces of the chamber; gas distribution means for supplying operating gas to the bottom of each cell and for directing it in vertical streams to the top thereof, the gas distribution means including devices for directing a first gas flow through the interior of the conduit to develop a high velocity gas flow therein and a second flow of gas externally of the conduit at a velocity less than that of the first gas flow; means for supplying coating material in a diffused spray to the interior of the conduit; means for supplying discrete particles to be coated to a cell at one end of the chamber whereby the particles are entrained in the operating gas for controlled circulation through the cell in an upward direction through the interior of the vertically extending conduit in contact with a spray of coating material therein arid in a downward direction in a subsidence zone exteriorly of the conduit; means for discharging coated product from a cell at the other end of the chamber; means for discharging operating gas from an upper region of the chamber; and means forming openings in each of the partitions for effecting the flow of particles into succeeding cells.

Another aspect of the invention relates to a process for applying a coating to discrete particles comprising the steps of supplying particulate material to a substantially closed chamber; conducting the particles through a plurality of cells within the chamber; within each cell, circulating the particles between co-directional gas streams defining a high velocity coating zone and a lower velocity subsidence zone; supplying coating material in a diffused spray to the fluid stream in the high velocity zone to contact the particles circulating therethrough; controlling the velocity of the fluid streams in the respective zones to recirculate the particles therebetween before discharging them to a succeeding cell; and discharging coated product from the last cell in the chamber.

It is thus an object of the invention to provide coated particles having a controlled, preferably narrow distribution of coating thickness in order that the coatings on the respective particles are substantially uniform.

Another object of the invention relates to a coating process and apparatus for the conduct thereof in which particles are coated in such a manner that narrow coating weight distribution between the respective particles is provided.

Still another object of the present invention relates to a coating process and apparatus for the conduct thereof in which the particles are coated in multiple stages.

Still another object of the invention is to provide a coating process and apparatus for the conduct thereof in which the residence time of the particles in the coating spray in each stage can be controlled so that the coating applied to the particles is substantially even and consistent.

Still another object of the invention is to provide a process and apparatus for the conduct thereof for the continuous production of coated particles.

These and other objects of the invention are accomplished by providing a multi stage apparatus for the continuous production of discrete coated particles. The apparatus includes a plurality of series-connected coating cells containing coating zones in which discrete substrate particles to be coated are conducted along co-directionally flowing gas streams of unequal velocity. Within each cell the particles are caused to move upwardly in the higher velocity gas stream which defines the coating zone of each cell and downwardly under the influence of gravity in the subsidence zone of each cell. The upwardly flowing gas stream in the subsidence zone serves to cushion the gravity-induced downward movement of the particles. Spraying means are disposed in the coating zone in the respective cells whereby a coating material, preferably in the form of droplets of a solution of the coating material in a liquid solvent carrier, is deposited on the respective particles during their residence time in the coating zones. Moreover, recirculation of the particles between the coating and subsidence zones in the respective cells enables a plurality of coating applications to be made while the particles are in each cell.

Means provided to control the gas flows to the respective zones in each cell enable the thickness and weight distribution of coating material applied to the particles to be accurately regulated. Also, the gas is supplied at elevated temperatures to the respective zones of the cells whereby the solvent carrier of the coating deposited on the particles can be evaporated in order to produce a coating of compact substantially even thickness on the particle surface.

Means are also provided for continuously feeding and controlling the feed rate of discrete substrate particles to the initial cell in the apparatus and for conveying the particles through succeeding cells thereof to a point of continuous discharge in the terminal cell in the series.

For a better understanding of the invention, its operating advantages and the specific objectives obtained by its use, reference, should be made to the accompanying drawings and description which relate to a preferred embodiment thereof.

DESCRIPTION OF THE PREFERRED EMBODIMENT

Figure 1:
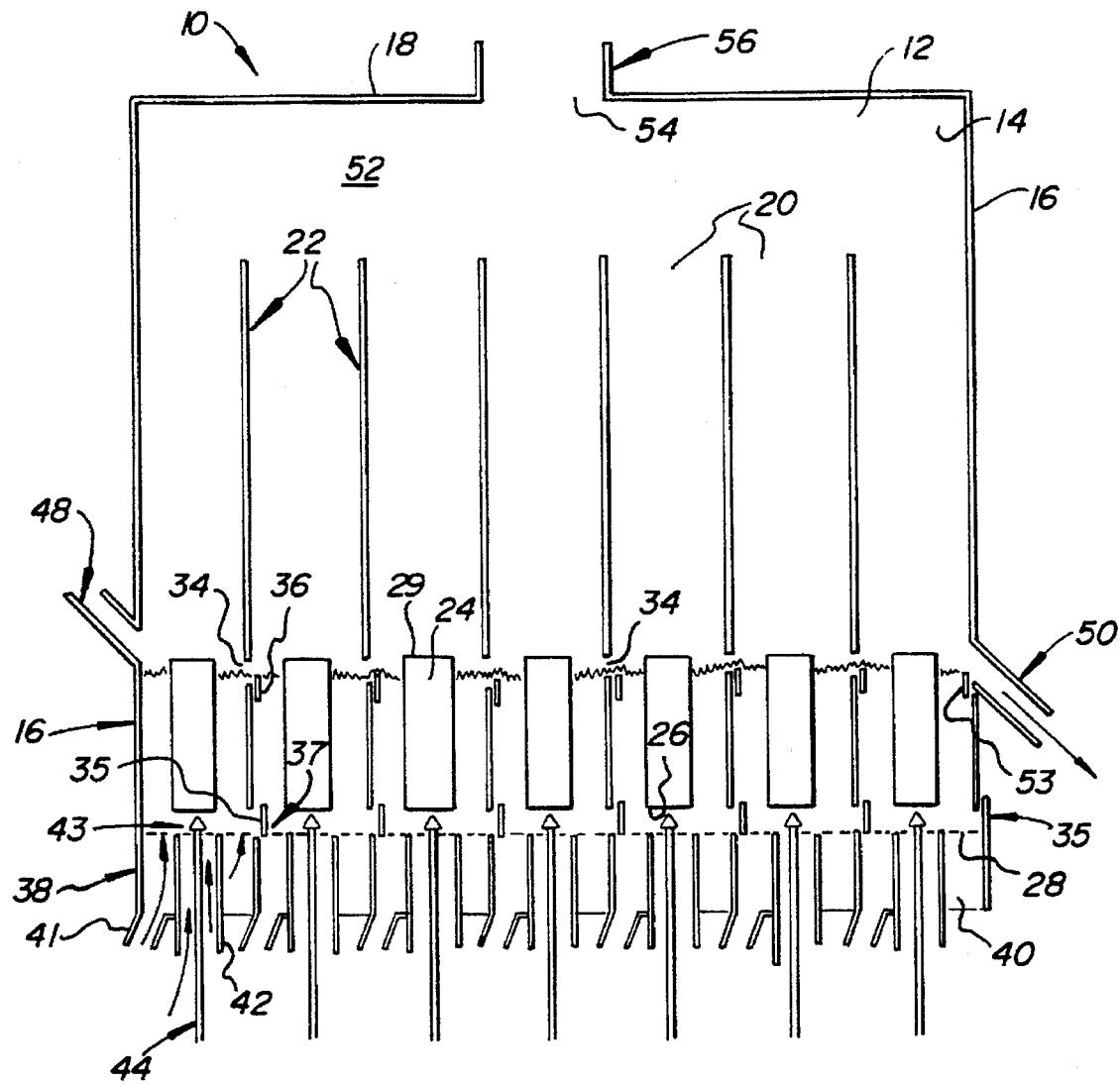
FIG. 1 is a schematic elevational representation of a multi-cell apparatus according to the present invention.
Figure 2:
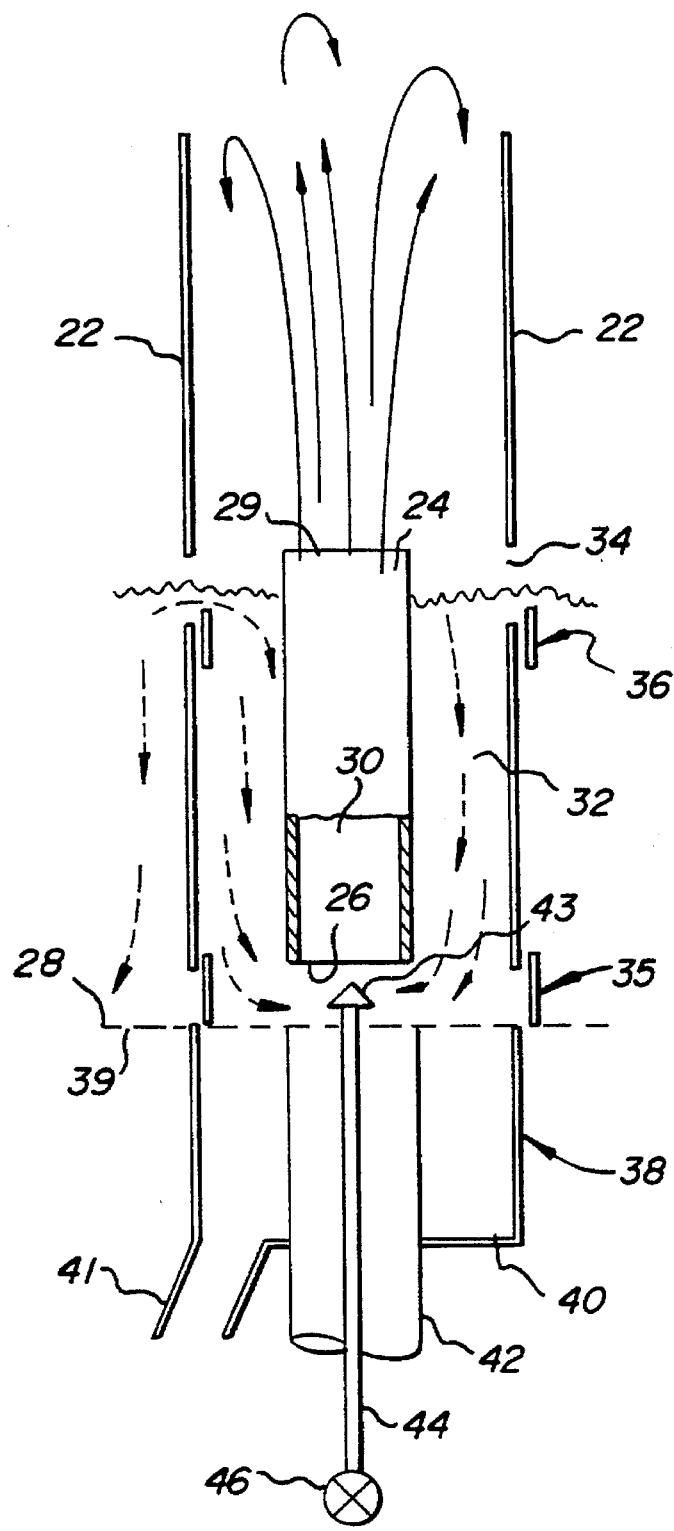
FIG. 2 is an enlarged fragmentary schematic elevational representation of a single cell according to the present invention.
Figure 4:
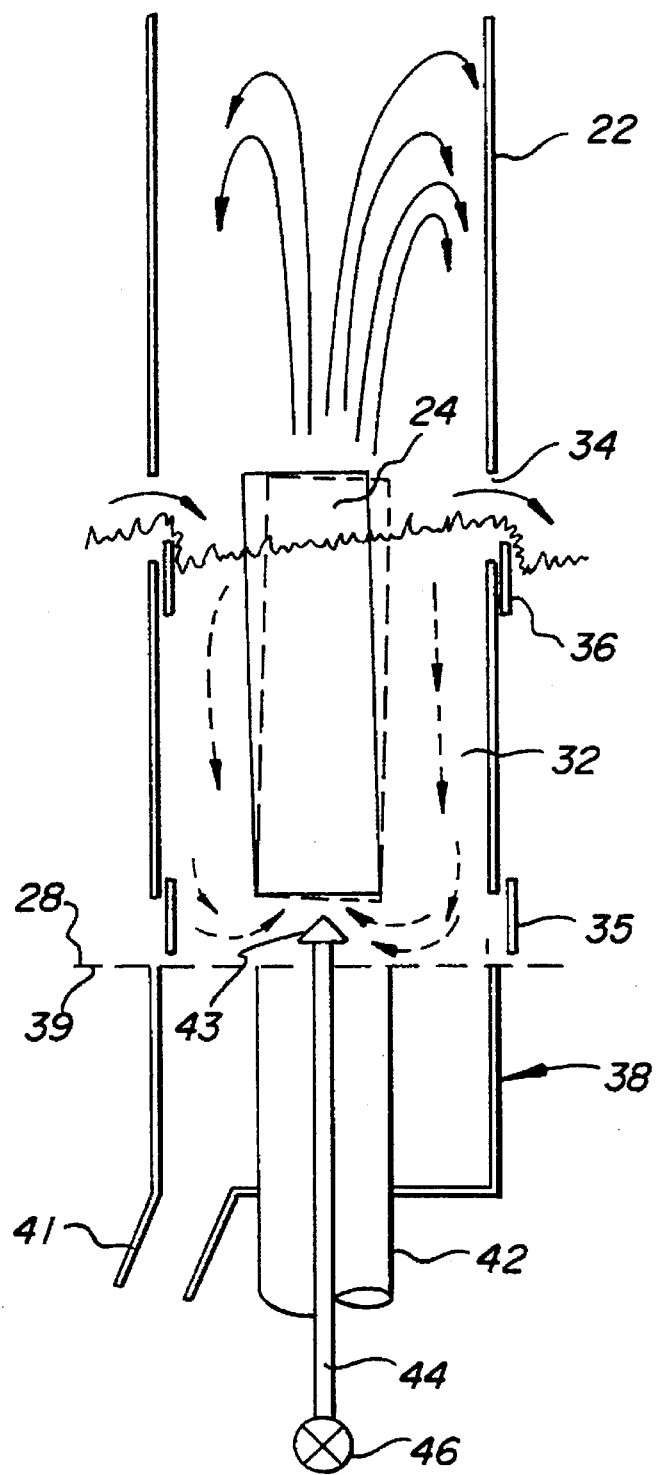
FIG. 4 is a schematic view similar to FIG. 2 showing the effect produced by tilting the central duct slightly.

FIGS. 1, 2 and 4 of the drawings show a schematic representation of coating apparatus 10 according to the invention. The apparatus 10 includes a substantially closed chamber 12 defined by a plurality of upstanding side and end walls, 14 and 16 respectively, and a roof 18. The interior of the chamber 12 is divided into a plurality of cells 20, here shown as being seven in number, by a plurality of longitudinally spaced, upstanding partitions 22 which extend transversely between the opposed side walls 14 of the apparatus 10, and have their upper ends spaced below the roof 18 to define a plenum space 52.

Within the lower portion of each cell 20 is positioned, substantially vertically disposed, a duct 24, that is desirably of hollow, cylindrical form but which may be of conical or other shapes. The duct 24 has its lower end 26 vertically spaced from the bottom of the cell 20, defined by a gas distributor plate 28, with the upper end 29 spaced well below the top of the partition 22. As shown, the ducts 24 divide each cell 20 into a coating zone 30 defined by the interior region of the duct and a subsidence zone 32 which occupies the space exteriorly of the duct. The cross section of the cell 20 shall preferably be of regular shape, e.g., substantially rectangular, circular, hexagonal, or octagonal, or combinations thereof.

In a typical example, the diameter of the duct 24 shall preferably be between 100 and 250 mm (approximately 4 to 10 inches). The height of the duct 20 shall preferably be between 400 and 1,000 millimeters (approximately 15 to 40 inches). The distance between the lower end of the duct 26 and the gas distributor plate 28 shall preferably be between 15 to 50 mm (about ⅝ to 2 inches). The area of the cross section of the subsidence zone 32 shall preferably be three to six times that of the duct 24. The height of the partition 22 over the upper end of the duct 29 shall preferably be between 1.5 and 3 meters (approximately 5 to 10 feet), enough to prevent particles flying over the partition into adjacent cells.

Each of the partitions 22 contains a transversely elongated opening 34 for connecting adjacent cells 20 in series. Each of the openings 34 is provided with a vertically adjustable closure plate 36 that operates to increase or decrease the overflow height through the partition 22 as well as increase or decrease the size of the opening 34 in order to control the rate of transfer of particles to the succeeding cell.

Further, each of the partitions 22 contains an opening 35 disposed adjacent the bottom of each cell 20 for connecting adjacent cells in series. Each of the openings 35 is provided with a closure plate 37 that effects the transfer of particles to succeeding cells when charging and emptying the apparatus.

The gas distributor plate 28 is advantageously made common to all of the cells 20 and is a perforated plate that separates the chamber 12 from operating gas supply apparatus, which is indicated generally as 38 in the drawings. The gas distributor plate 28 may be formed as a substantially flat plate containing a plurality of openings 39 as represented in the drawings hereof. The number of holes per unit of plate area is preferably greater in the coating zone than in the subsidence zone. Alternatively, the gas distributor plate 28 may be formed of a heavy woven screen material (not shown). In either event, the size of the perforations or openings in the plate shall be such as to prevent the particles from falling through the plate from the cells 20 to the subjacent gas supply apparatus 38.

Gas supply apparatus 38, as schematically represented in the drawings, includes in association with each cell 20, a manifold chamber 40 having a supply pipe 41 for supplying conditioned bed gas in amounts regulated by appropriate valves (not shown) upwardly into the subsidence zone 32 of the cell. Concentrically placed within the manifold chamber 40 is a conductor 42 containing valving (not shown) for supplying conditioned gas into the coating zone 30 within the interior of the duct 24.

The gas employed for system operation is typically air, but may also be other gases such as nitrogen, carbon dioxide, or similar gases, or mixtures thereof whose properties are substantially inert with respect to the coating and particulate material being processed. In the practice of the invention, the operating gas is supplied in regulated amounts to the cells 20 at an elevated temperature to provide drying. The temperature is selected in dependance of the nature of the liquid carrier and the thermal stability of active ingredient.

The coating material, which may be dissolved, emulsified or dispersed in an organic solvent or mixture of solvents, is supplied to the coating zone 30 through an atomizing nozzle 43 at the terminal end of a supply pipe 44 containing a flow control valve 46. Coating materials suitable for use in the process include sulfur, petroleum waxes, chemical resins, and the like. As shown in the drawings, the nozzle 43 is placed between the gas distribution plate 28 and the lower end 26 of the tube 24. Alternatively, the nozzle 43 may be positioned within the tube 24 adjacent its lower end 26, or even flush with the gas distributor plate 28, as desired, provided the spray from the nozzle 43 is directed upwardly into the coating zone 30 within the interior of the tube 24.

Figure 5:
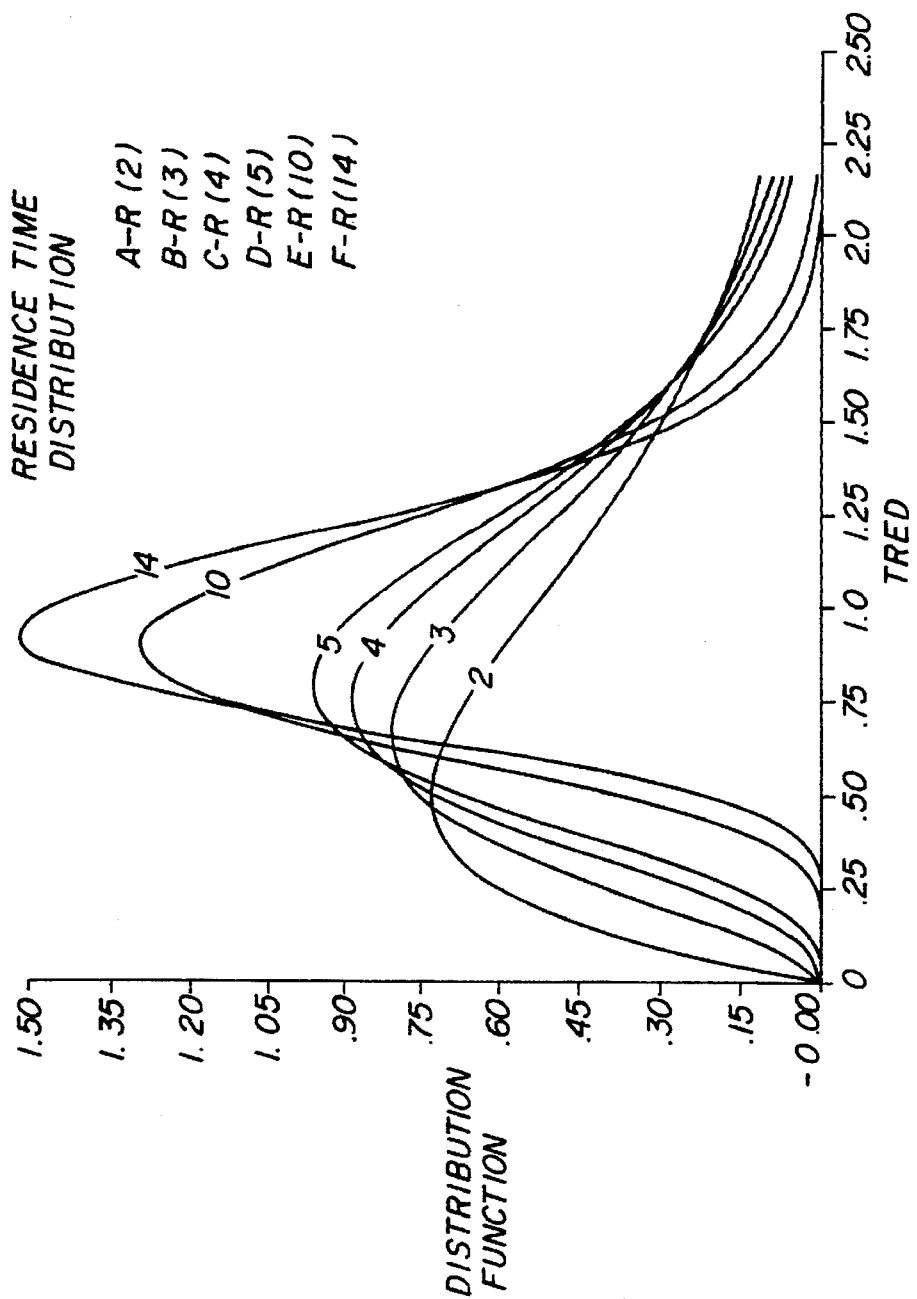
FIG. 5 is a graphical representation of theoretical Particle Residence Time Distributions for 2, 3, 4, 5, 10 and 14 cells arranged according to the invention.

In the operation of the invention, particulate materials in the form of granules, particles, prills, or the like, as a substrate or core are processed on a continuous basis through a series of coating cells 20, in each of which a specified portion of the total coating material is applied while the particles are caused to circulate at a controlled rate through the coating zone 30 in each cell. Although the described embodiments of the invention contains seven cells 20, it will be understood that a larger or smaller number of cells can be employed without departing from the spirit of the invention which contemplates, in its broadest aspect, the provision of a plurality of series-connected cells in each of which the coating operation, as hereinafter described, is conducted. By providing a plurality of cells connected in series, the probability of particles being insufficiently or excessively coated is substantially reduced as compared with an apparatus having only a single cell. As the number of cells in an apparatus of the described type increases, the probability of a particle by-passing the coating spray in all cells is reduced. Similarly, the probability of a particle being excessively sprayed is also reduced. These effects are graphically illustrated in FIG. 5 where the theoretical particle residence time distributions are shown for two, three, four, five, ten and fourteen cells arranged according to the invention.

It will be obvious that e.g., two cells only cannot fulfill any high demands for uniformity of the coatings. For many applications, five to ten cells arranged according to the invention will yield an adequate quality coating. For very compact coatings of substantially even thickness, it may be necessary to apply twenty to thirty cells arranged according to the invention.

Figure 7:
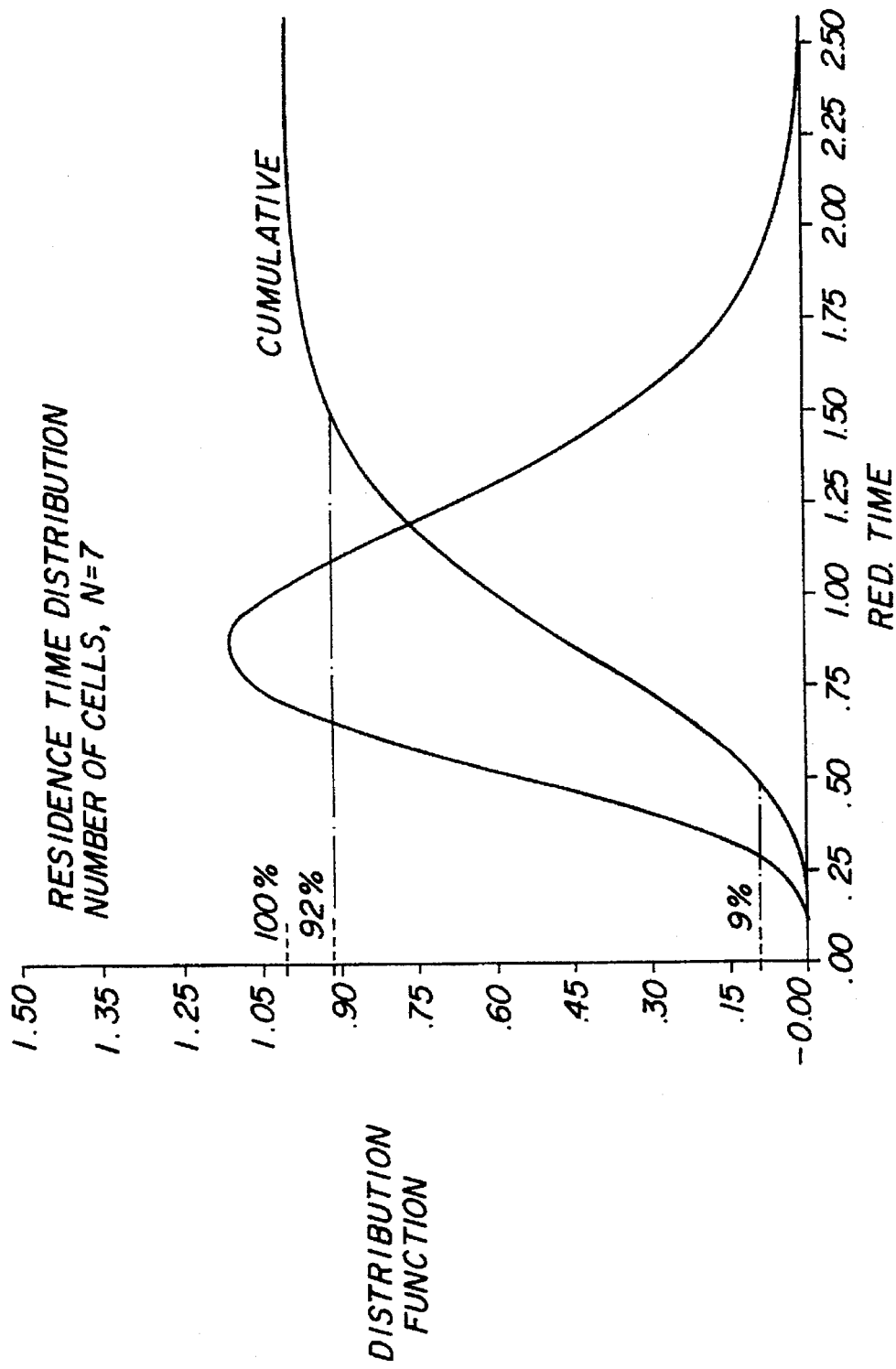
FIG. 7 is a graphical representation of the Particle Residence Time Distribution in an apparatus with seven cells, together with the integral of the distribution curve representing an age distribution of the particles at the exit of the last cell.

Accordingly, the described invention contemplates the apparatus 10 being provided with two or more cells 20. In a seven cell apparatus, as described, the probability of a particle not being sufficiently coated in one cell, or remaining for an extended period in an excessive number of cells, is adequately small for many practical applications. This is graphically illustrated in FIG. 7. It will appear that only 9% of the particles will exit the apparatus before having been retained for 50% of the average residence time. Only 8% of the particles will be retained for more than 150% of the average residence time. It is obvious that the apparatus must be constructed in such a way that residence time distributions close to the theoretical ones can be obtained.

Figure 6:
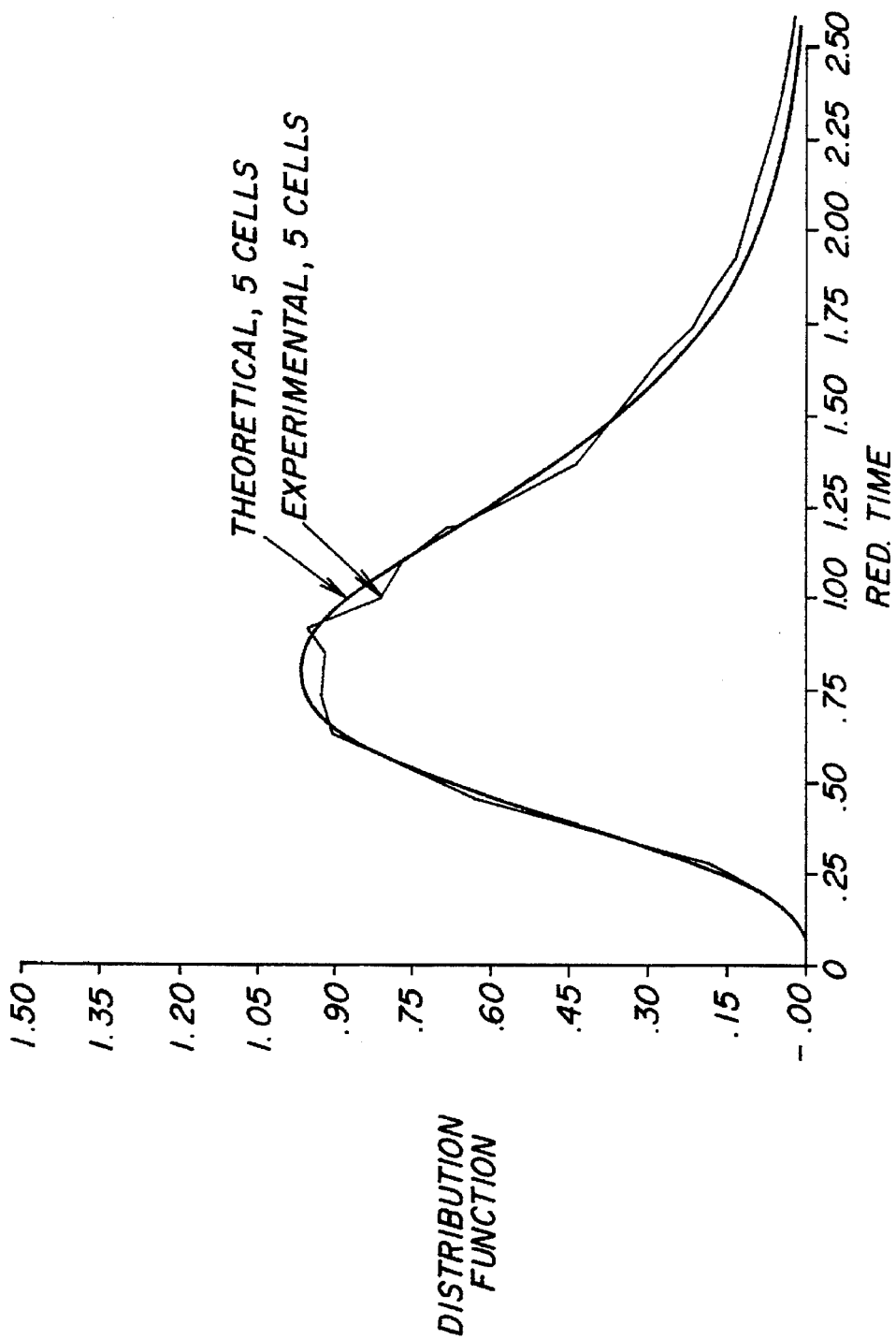
FIG. 6 is a graphical representation of the Particle Residence Time Distribution obtained in an experimental apparatus employing five cells according to the invention compared with the Theoretical Residence Time Distribution curve for five cells.

An experiment was carried out on an apparatus with five cells according to the invention:

Steady state operation was established feeding 150 kg/h of white urea particles into the apparatus. At a time called zero, 5 kg of black colored urea particles were fed into the apparatus while maintaining all operating parameters constant. Samples the exit particles were taken every sixth minute for 2-½ hours. The average residence time was about one hour. The concentration of black particles ion the samples was determined by counting and the residence time distribution was calculated. This curve is shown in FIG. 6, and for comparison, the theoretical curve is also shown. It is obvious from these illustrations that the apparatus according to the invention performs exceptionally close to the theoretically possible limit.

The apparatus 10 according to the invention operates in the following way: Conditioned operating gas is supplied controlled amounts through the gas distributor plate 28 from the manifold chamber 40 and from the gas conductor 42. Operating gas to the cell 20 is regulated in such a manner that the velocity of the gas admitted to the coating zone 30 exceeds that supplied to the subsidence zone 32. Simultaneously therewith, coating material in a solvent carrier is introduced at a controlled, uniform rate into the coating zone 30 as a finely atomized spray through the nozzle 43. When there is more than one duct 24 in a cell, there is a corresponding number of coating zones 30 in each cell. While in the principle embodiment of the invention one duct 24 is substantially centrally disposed in each cell, it is conceivable to employ more than one duct in each cell with a corresponding number of coating zones 30. Operating gas flows to the respective zones 30 and 32 are such that particles introduced into the gas streams are carried in the high velocity gas stream through the coating zone 30 within the duct 24 and pass through the spray of coating material from the coating spray nozzle 43 whereby droplets of coating material impinge on the surface of the particles during their residence time within the coating zone. Upon emerging from the top end of the coating zone 30, the particles are discharged into the more quiescent, lower velocity region thereabove and fall down into the subsidence zone 32 wherein the effects of gravity and the upwardly directed lower velocity stream of operating gas therein cooperate to effect a cushioned migration of the particles in a plug flow manner downwardly through this zone.

The evaporation of the solvent part of the coating starts in the upper end of the coating zone 30, and continues in the lower velocity region. A fraction of the particles corresponding to the feed rate to the apparatus 10 will migrate through opening 34 into the succeeding cell. Within the subsidence zone 32, the evaporation of the solvent is completed, leaving a compact layer of the coating material on each particle. Adjacent to the bottom of each cell 20, the particles re-enter the higher velocity gas flow to the coatings zone 30, whereby the particles are recirculated through the coating spray to acquire another layer of coating material.

The operating gas admitted to the coating and subsidence zones 30 and 32 flows upwardly through the cells 20 and exits into the plenum space 52 for discharge from outlet 54 through conduit 56 whence the gas, with entrained solvent vapors, is conducted to appropriate processing apparatus whereby the gas and, solvent components of the mixture can be separated in a well. known manner and returned to the apparatus 10 for reuse. Hence, a preferred embodiment of the apparatus according to the invention includes means for exhausting spent gas from the apparatus and for recirculating it as operating gas through the apparatus.

According to the present invention particulate material to be processed is charged to the apparatus 10 via the particle inlet conduit 48 which communicates with the first cell 20 in the series. Following processing in each cell 20 in the aforementioned manner, the particles are transferred in series flow to the succeeding cells through the openings 34 in the respective partitions until the particles emerge from the terminal cell through an opening in the end wall 16 of the apparatus, the effective size of which opening is controlled by vertically movable plate 53 comparable to the plates 36 which control the size of the openings 34 in the partitions 22 via outlet conduit 50 as final product having a surface coating of the desired thickness. The transfer from one cell to the next is normally accomplished by gravity flow. It is obvious that this will require a level difference between the cells. For constructional reasons, this is inconvenient when many cells are required. With reference to FIG. 4, it has been found that by tilting the coating duct 24 a few degrees toward the opening 34 to the succeeding cell, the average level height of the body of particles in the subsidence zone 32 can be kept substantially uniform for all cells. Angular deflections of the duct axis up to five degrees, preferably between two and three degrees, from the vertical are acceptable for this purpose. The average height of the level of the body of particles is then controlled solely by the setting of the outlet conduit 50. No detectible adverse effects have been found when using this embodiment.

The transfer from one cell to the next can also be assisted by other means not shown, e.g., by blow pipes where compressed gas jets push the particles forward. Control of the application of coating material to the substrate particle in each cell 20 can be accurately maintained because, as the weight of particulate materials passing through each cell on a time basis, is controllable by control of the rate of charge of particulate via inlet conduit 48 and, since the supply of coating material to the coating zones 30 is maintained constant, the weight of coating material applied to the particulates passing through each cell is determinable. Also, as the total number of passes the particles make through the respective coating zones 30 is a function of the size of the opening at the lower end 26 of the duct (or ducts) 24 and the amount of operating gas supplied to the ducts, the number of layers of coating material applied to each particle can be determined.

The primary controlling factor in the operation of the apparatus is the available bottom opening of the tube 24 and the amount of high velocity operating gas supplied to the coating zone 30 therein. Thus, for example, in a seven cell unit corresponding to that illustrated in FIG. 1, if operating gas is supplied to the coating zone 30 of the duct 24 at a rate to create four recirculated passes of particulate material within each cell 20, an average particle will, upon discharge from the outlet conduit 50 contain twenty-eight layers of coating material. Similarly, the supply of operating gas to the cells 20 to create eight passes will produce a final product containing fifty-six layers of coating materials. If sufficient high velocity operating gas is supplied to the interior of the duct 24 to obtain twelve recirculations of the average particle while in each cell 20, the average particle will receive eighty-four layers of coating material.

In practice, the process is operated to obtain a coated product that is most cost effective. This is a product that meets a market need and is produced at minimum cost. In the instant process, one can optimize the process to produce a coated product having a desired degree of release control by utilizing the minimum amount of coating material that need be used. This can be illustrated by reference to the following specific examples of procedures for producing coated urea particles at the rate of 500 kg per hour, which particles have a bulk density of about 0.8 kg per liter and a particle size distribution of from about 1.8 mm. to about 3 mm. In the described examples, the stream of operating gas delivered to the subsidence zone 32 in the respective cells 20 has flow rates controlled to between about 0.6 meters per second and about 0.9 meters per second and that delivered to the coating zone 30 is delivered at flow rates of between about 8 meters per second and 15 meters per second.

EXAMPLES

Description of the Apparatus Employed

Description of the apparatus used in the examples:

| | | |
|---|---|---|
| Number of cells | = | 7 |
| Diameter of duct 24 | = | 203.2 mm (8 inches) |
| Height of duct 24 | = | 812.8 mm (32 inches) |
| Distance over gas distributor plate 28 | = | variable from 19–38 mm (¾–1½ inches) |
| Forward tilting angle of duct 24 | = | 2 degrees |
| Cell cross-sectional shape | = | equilateral octagon |
| Sidelenght of octagon | = | 190.4 mm (7½ inches) |
| Cross-sectional area of duct 24 | = | 0.0324 m² (0.35 sq. ft.) |
| Cross-sectional area of subsidence zone 32 | = | 0.1426 m² (1.53 sq. ft.) |
| Cross-sectional area ratio of subsidence zone 32 and duct 24 | = | 4.4 |
| Height of partitions 22 over duct end 29 | = | 1.82 m (6 ft.) |
| Height of the exit weir 53 in the exit opening 50 in last cell | = | 572 mm (22½ inches) |

EXAMPLE 1

Procedure

1. Open the closure plate 35 and start gas flows.
2. Charge the system with 485 kg of urea prills.
3. Adjust preliminary operating gas flow to the respective zones 30 and 32 in each cell 20 so that the particles will move as a fluid and be distributed into all of the seven cells.
4. Adjust the operating gas flow to the coating zone 30 in each cell 20 to a rate of about 8 meters per second so that the average particle in each cell is caused to be recirculated through the coating zones 30 about four times in 8.57 minutes. Operating gas is admitted to the subsidence zones 32 in the respective cells at a rate of about 0.8 meters per second.
5. Close the closure plates 35.
6. Initiate the flow of prills through the inlet conduit 48 at a controlled rate of 485 kg per hour.
7. Adjust the temperature of the operating gas supplied to both of the zones 30 and 32 to about 60° C. (i.e., that sufficient to evaporate the solvent carrier in the respective zones).
8. Initiate the spray of coating material through the nozzle 43 into all cells at a rate of 2.142 kg per hour dry basis.
9. Determine an equilibrium condition at the end of 2-½ hours of operation which corresponds to 2-½ times the average residence time at which coated product emerging from the discharge conduit 50 comprises 97% by weight substrate and 3% by weight coating material deposited in twenty-eight layers on each particle.

Operating Conditions 1. 485 kg per hour urea prills processed.
15 kg per hour coating material applied dissolved in 485 kg of toluene.
3. 500 kg per hour product having 35 by weight coating produced.
2. An average particle passes through seven cells in sixty minutes.
60/7=8.57 minutes residence time in each cell.
3. High velocity operating gas at a velocity of 8 meters per second to one coating zone 30 sufficient to cause four recirculations of an average particle through each coating zone in 8.57 minutes.
4. 15/7=2.1428 kg of coating material sprayed per hour into the coating zone 30 of each cell 20.
5. Each cell 20 has a working capacity of 500/7=71.43 kg.

EXAMPLE 2

Repeat the conditions of Example 1 using a setting of the bottom opening of duct 24 and a flow of operating gas thereto at a rate of about 9 meters per second to cause an average particle to pass through the coating zone 30 in each cell eight times during the 8.57 minutes residence time. The prill product comprises 97% particulate core material and 3% coating material deposited in fifty-six layers.

EXAMPLE 3

Repeat the conditions of Example 1 using a setting of the bottom opening of duct 24 and a flow of operating gas thereto at a rate of about 10 meters per second to cause an average particle to pass through the coating zone in each cell twelve times during residence in each cell. The prill product comprises 97% particulate core material and 3% coating material deposited in the form of eighty-four layers on each particle.

EXAMPLE 4

Repeat Example 1 using 10 kg per hour of coating material per 485 kg per hour core material and an operating gas velocity of 8 meters per second to the coating zone 30 and a gas velocity of 0.6 m/s in the subsidence zone 32. The prill product comprises 97.98% core material and 2.02% coating material deposited in twenty-eight layers on each particle.

EXAMPLE 5

Repeat Example 2 using 10 kg per hour of coating material per 485 kg per hour core material, a gas velocity of 9 meters per second and a gas velocity of 0.6 m/s in the subsidence zone. The prill product comprises 97.98% core material and 2.02% coating material deposited in fifty-six layers on each particle.

EXAMPLE 6

Repeat Example 3 using 10 kg per hour of coating material per 485 kg per hour core material using a gas velocity of 10 meters per second. The prill product comprises 97.98% core material and 2.02% coating material deposited in the form of eighty-four layers on each particle.

EXAMPLE 7

Repeat Example 3 using 485 kg per hour core material and 20 kg per hour coating material, a gas velocity of 10 meters per second and a gas velocity of 0.9 m/s in the subsidence zone. The prill product comprises 96.04% core material and 3.96% coating material. The coating comprises eighty-four layers on each particle.

EXAMPLE 8

Repeat Example 7 using a setting of the bottom opening of duct 24 and a gas velocity of about 12 meters per second providing a coating of 188 layers on each particle.

Figure 3:
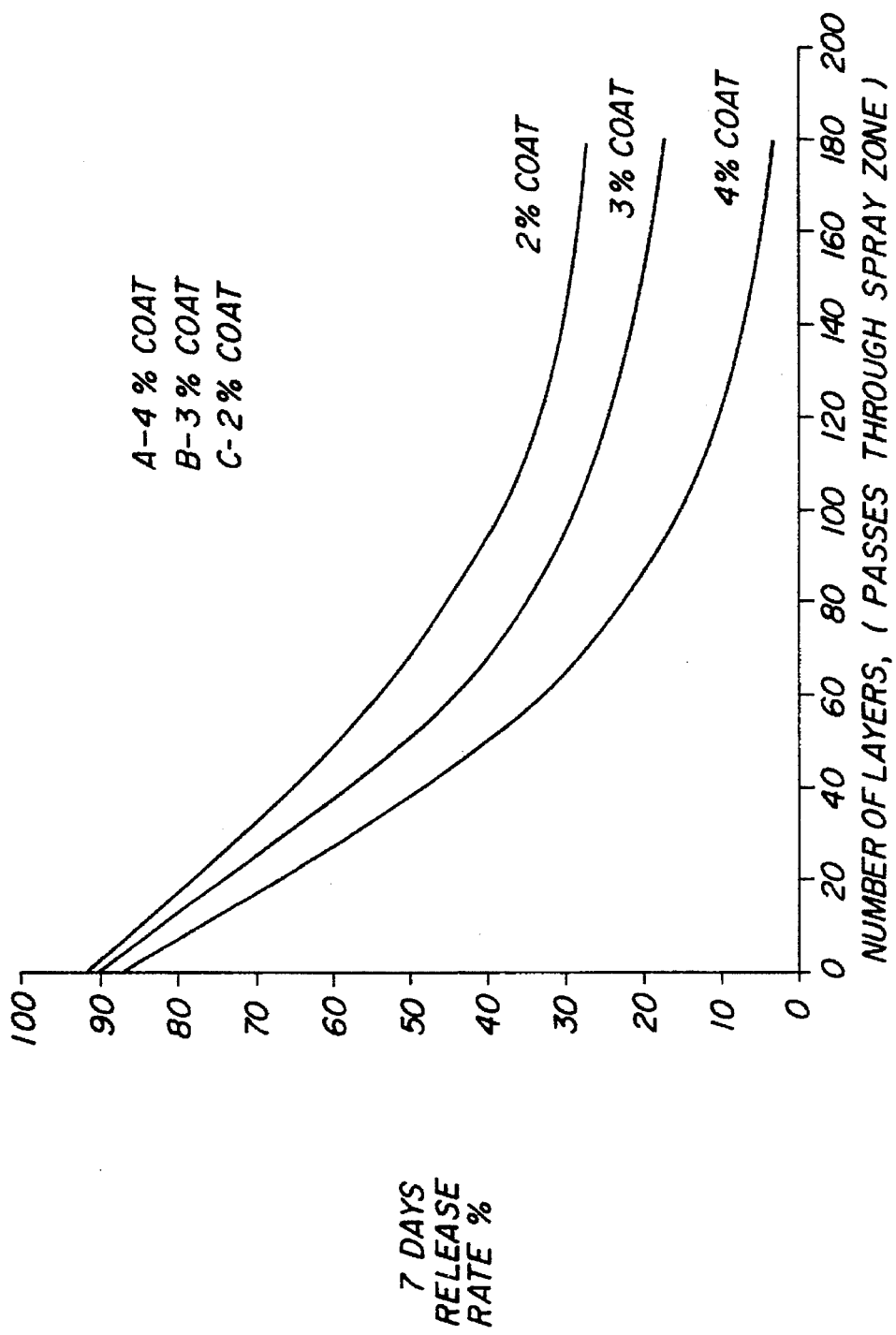
FIG. 3 is a diagram showing the rate of dissolution of fertilizer particles coated according to the present invention as a function of the quantity of coating applied and the number of coating application.

FIG. 3 is a diagram illustrating the rate of dissolution of fertilizer particles coated according to the above examples.

The desired 7-day release rate for slow and controlled release fertilizers is generally below fifty percent. Thus, from the diagram it will be seen that the production of coated fertilizers having varied amounts of coating will provide diverse rates of release of nutrients.

Figure 8:
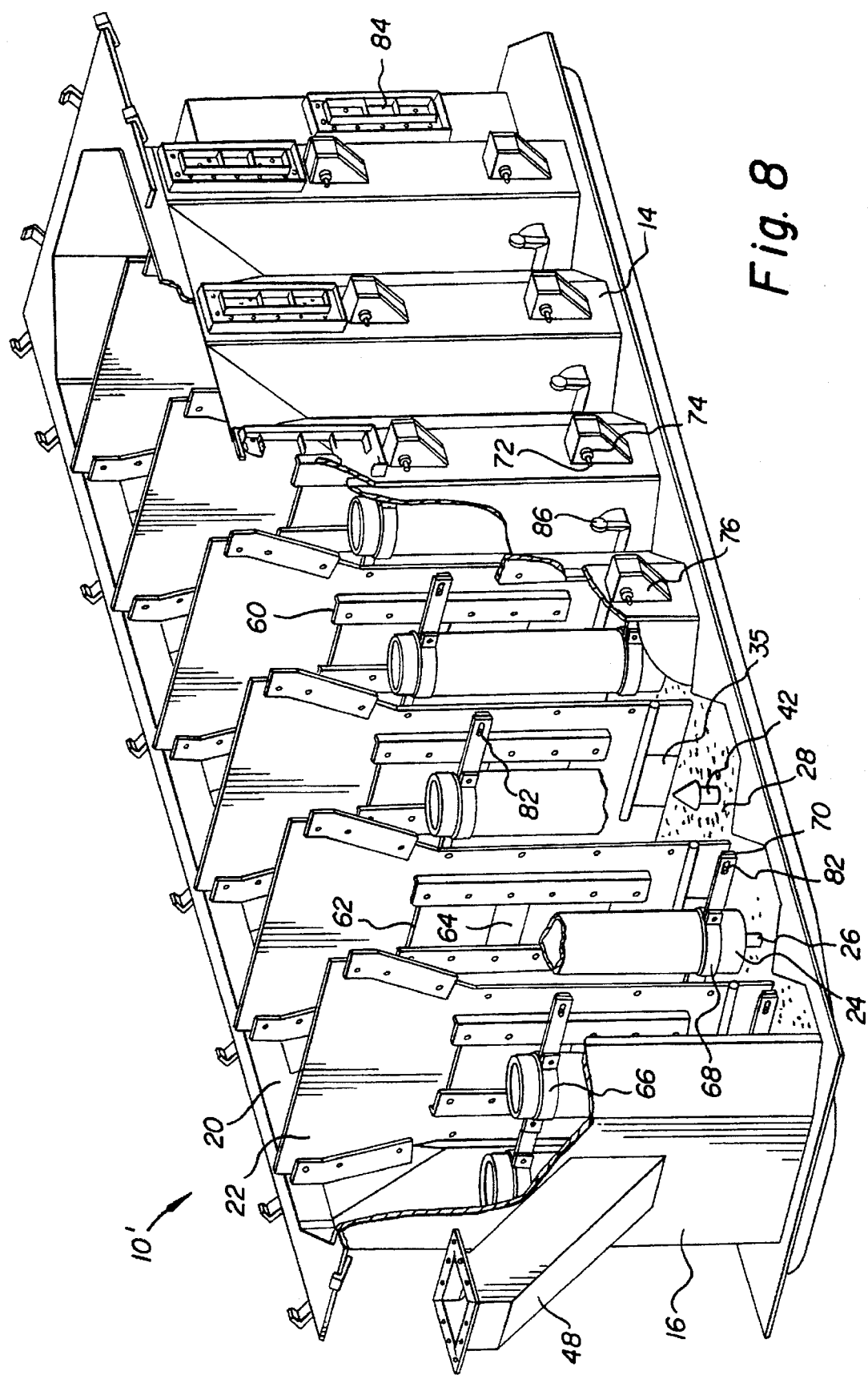
FIG. 8 is a partial perspective view of a commercial production embodiment of the present invention.
Figure 9:
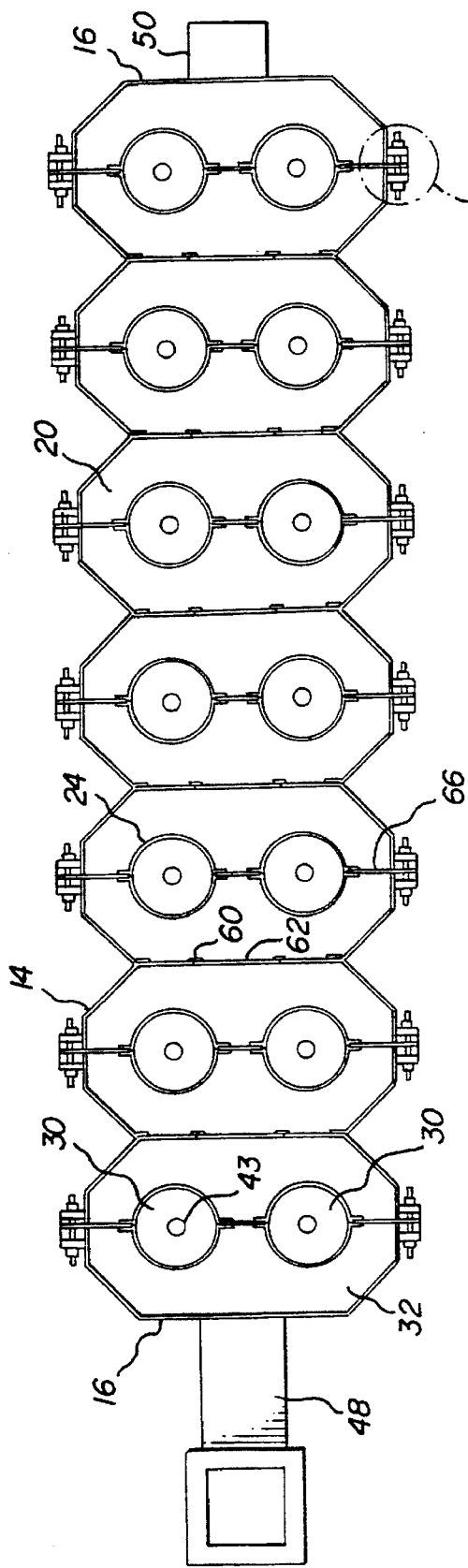
FIG. 9 is a sectional plan view of the apparatus shown in FIG. 8.
Figure 10:
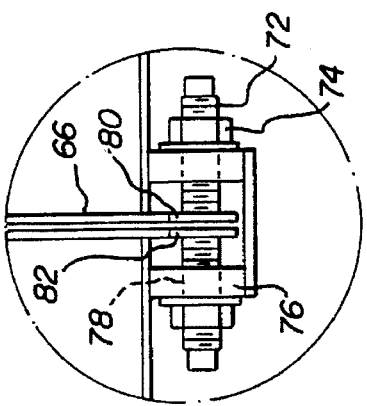
FIG. 10 is an enlarged view of part of the duct tilting mechanism employed in the apparatus of FIG. 8.

FIGS. 8, 9 and 10 wherein similar reference numerals are employed to designate similar elements of the inventive apparatus, illustrate the medial portion of one form of commercial production embodiment of the invention, the upper portion defining the plenum space 52 and the lower portion defining the manifold chamber 40 being omitted for sake of clarity. As shown, this embodiment of the invention, in order to enhance the production capacity of the equipment, includes a pair of tandem-connected ducts 24 disposed in each cell 20. Moreover, in order to regulate particle flow through the device, the ducts 24 are adapted for angular displacement of their central axes as well as linear movement transversely of the respective cells.

Thus, the coating apparatus, indicated generally as 10' comprises a series of cells 20 defined by vertical partitions 22 which extend transversely of the side walls 14. Particle inlet 48 penetrates one end wall 16 while particle outlet 50 penetrates the other end wall. As shown in FIG. 9, the side walls 14 and partitions 22 are so-formed as to cooperatively define cells 20 that are essentially octagonal in section. Each partition contains an opening (not shown) which is framed on two sides by a pair of mounting brackets 60 for retaining a particle flow control plate 62 that covers the partition opening. Plate 62 is formed with an opening 64 which establishes flow communication between adjacent cells 20 and is movable by moving the plate 62 with respect to the brackets 60.

Each cell 20 contains a pair of ducts 24 defining coating zones 30. The ducts 24 are connected in tandem by strapping plates 66 and 68 which secure the ducts adjacent their upper and lower ends, respectively, and that enable the position of the ducts to be adjusted transversely of each cell. Means are provided to enable axial tilting of the ducts either toward or away from the respective partitions 22. Tilting of the duct pairs is effected by the connection of ends 70 of the respective strapping plates 66 and 68 to lead screws 72 disposed externally of opposed side walls 14 and threadedly attached via lock units 74 to mounting studs 76 having aligned openings 78 for reception of the screw. Each lead screw 72 is adapted to threadedly engage a collar 80 seated against rotation in an elongated opening formed by slots 82 in the plates. Accordingly, tilting of the ducts toward or away from the adjacent portion 22 is achieved by adjusting the relative fore and aft positions of the respective upper and lower ends of the connected ducts 24 by rotation of the screws 72 within the collars 80. In practice, angular displacements of the ducts 24 of up to about five degrees is contemplated with adjustment capability of between two and three degrees being preferred.

Also, it will be appreciated that the cooperation of the collars 80 in the slots 82 of the respective strapping plates 66 and 68 enables the position of the connected ducts 24 to be adjusted in the transverse direction within each cell.

Besides these described elements of particle flow adjustment, another element of particle flow regulation is obtained by the ability to vertically adjust the position of the flow control plate 62 on each partition and, thereby, the location of the opening 64 that establishes communication between adjacent cells 20. Thus, in addition to the ability to increase particle flow between adjacent cells 20 and thereby reduce the amount of recirculation of the particles through the respective coating zones 30 by tilting the ducts 24 toward the succeeding cell, as described before in connection with FIG. 4, an increase in particle flow between adjacent cells can also be obtained by lowering the position of the opening 64 in the respective partitions 22. Conversely, a decrease in particle flow rate between succeeding cells with a concomitant increase in particle recirculation through the coating zones 30 is accomplished by tilting the ducts 24 away from the partition 22 and/or by moving the flow control plate 62 to raise the opening 64 therein.

It will be appreciated that, while tilting adjustments of the ducts 24 can be effected during periods of apparatus operation, adjustments made to the transverse position of the ducts and to the location of the openings 64 between adjacent cells 22 can be made only when apparatus operation has been terminated and the interior of the chamber 12 exposed.

The described apparatus advantageously contains viewing windows 84 provided in a side wall 14 of each cell to permit observation of the various stages of the particle-coating process. Also, in the described arrangement, the closure 35 at the bottom of each cell is pivotally secured to the partition wall and an operating handle 86 is provided exteriorly of each cell whereby the closure can be moved between its open and closed positions and the loading and unloading of the apparatus facilitated.

It will be understood that various changes in the details, materials and arrangements of parts which have been herein described and illustrated in order to explain the nature of the invention may be made by those skilled in the art with the principle and scope of the invention as expressed in the appended claims. For example, although the description herein is directed to apparatus in which the cell structure is essentially rectangular or octagonal in section, it will be understood that the sectional shapes of the described cells can be other than these, such as for example other polygonal shapes, or circular. Also, while the described apparatus employs series-connected cells which are disposed in longitudinal, end-to-end alignment, other alignments as, for example, a clustered alignment of the cells with annular or similar disposition may be employed in practice of the invention.

What is claimed:

1. A process for supplying coatings to discrete particles comprising the steps of:

supplying particulate materials to a substantially closed chamber;

conducting the particles through a plurality of cells within the chamber;

within each cell, circulating the particles between codirectional gas streams defining a high velocity coating zone and a lower velocity subsidence zone in which gas stream velocity is lower than in said high velocity coating zone;

supplying coating materials in a diffused spray to the gas stream in the high velocity coating zone to contact the particles circulating therethrough;

controlling the velocity of the gas streams in the respective zones to recirculate a portion of the particles between the respective zones and discharging the remainder to a succeeding cell; and discharging coated product from the last cell in the chamber.

2. The process according to claim 1 including the step of supplying said coating material dissolved, emulsified or dispersed in a solvent carrier.

3. The process according to claim 1 including the step of heating the gas stream conducted through the cells to a temperature sufficient to evaporate the solvent leaving the coating material on the particles.

4. The process according to claim 1 including the step of controlling the thickness of coating material applied to the particles by independently controlling the velocities of the gas streams in the respective zones of each cell.

5. The process according to claim 4 including the step of conducting the particles sequentially through a plurality of cells.

6. The process according to claim 1 in which urea particles are coated with a polymer which is soluble in water.

7. The process according to claim 1 including the step of angularly varying the disposition of the high velocity coating zone for controlling the rate of transfer of particles into succeeding cells.

* * * * *